(12) United States Patent
Ballani et al.

(10) Patent No.: US 9,077,670 B2
(45) Date of Patent: Jul. 7, 2015

(54) DEADLINE-AWARE NETWORK PROTOCOL

(75) Inventors: Hitesh Ballani, Cambridge (GB); Thomas Karagiannis, Cambridge (GB); Antony Rowstron, Cambridge (GB); Christopher Wilson, Santa Barbara, CA (US)

(73) Assignee: Microsoft Corporation, Redmond, WA (US)

( * ) Notice: Subject to any disclaimer, the term of this patent is extended or adjusted under 35 U.S.C. 154(b) by 369 days.

(21) Appl. No.: 12/969,228

(22) Filed: Dec. 15, 2010

(65) Prior Publication Data

US 2012/0155265 A1    Jun. 21, 2012

(51) Int. Cl.
*H04B 7/204* (2006.01)
*H04L 12/911* (2013.01)

(52) U.S. Cl.
CPC .................................. *H04L 47/826* (2013.01)

(58) Field of Classification Search
USPC .................................. 370/310, 235, 229–231
See application file for complete search history.

(56) References Cited

U.S. PATENT DOCUMENTS

| 8,181,210 B2 * | 5/2012 | Amir et al. ....................... 725/98 |
| 8,339,947 B2 * | 12/2012 | Lee et al. ....................... 370/230 |
| 2009/0164293 A1 | 6/2009 | Coley | |

OTHER PUBLICATIONS

"10 eBay Secrets for Planet Wide Scaling", retrieved on Oct. 7, 2010 at <<http://highscalability.com/blog/2009/11/17/10-ebay-secrets-for-planet-wide-scaling.html>>, Possibility Outpost, High Scalability, Nov. 17, 2009, pp. 1-7.
Abu-Libdeh, et al., "Symbiotic Routing in Future Data Centers", retrieved on Oct. 8, 2010 at <<http://research.microsoft.com/en-us/um/people/antr/Publications/sigcomm10-camcube.pdf>>, ACM SIGCOMM, New Delhi, India, 2010, pp. 51-62.
Alizadeh, et al., "Data Center TCP (DCTCP)", retrieved on Oct. 8, 2010 at <<http://conferences.sigcomm.org/sigcomm/2010/papers/sigcomm/p63.pdf>>, ACM SIGCOMM, New Delhi, India, 2010, pp. 63-74.
Alizadeh, et al., "Data Center Transport Mechanisms: Congestion Control Theory and IEEE Standardization", retrieved on Oct. 8, 2010 at <<http://www.stanford.edu/~balaji/papers/QCN.pdf>>, IEEE, Allerton Conference, Illinois, Sep. 2008, pp. 1270-1277.
Alizadeh, et al., "DCTCP: Efficient Packet Transport for the Commoditized Data Center", retrieved on Oct. 8, 2010 at <<http://research.microsoft.com/pubs/121386/dctcp-public.pdf>>, ACM SIGCOMM, New Delhi, India, Jan. 2010, pp. 1-15.

(Continued)

*Primary Examiner* — Afshawn Towfighi
(74) *Attorney, Agent, or Firm* — Steve Wight; Judy Yee; Micky Minhas (57) ABSTRACT

A deadline-aware network protocol is described. In an example, data transfer at a transport layer entity of a packet-based communication network is controlled by receiving a request for network resources for a data flow from a network element and allocating network resources to the data flow. The data flow comprises a number of data packets associated with an application, and the request comprises a factor relating to a time deadline associated with the application. The network resources allocated depend on the factor relating to the time deadline. In examples, the network resource can be a bandwidth or data rate allocated to the data flow, and the factor can be a data rate sufficient to complete the data flow within the time deadline. In examples, the network resources are allocated greedily, such that requests are fully satisfied whenever possible, and the network resources are fully utilized.

20 Claims, 8 Drawing Sheets

(56) References Cited

OTHER PUBLICATIONS

Aras, et al., "Real-Time Communication in Packet-Switched Networks", retrieved on Oct. 8, 2010 at <<http://rtcomm.csc.ncsu.edu/papers/RTCommPkt.pdf>>, Proceedings of IEEE, vol. 82, No. 1, Jan. 1994, pp. 122-139.

Beaver, et al., "Finding a needle in Haystack: Facebook's photo storage", retrieved on Oct. 8, 2010 at <<http://www.usenix.org/events/osdi10/tech/full_papers/Beaver.pdf>>, USENIX Association, Proceedings of Conference on Operating Systems Design and Implementation (OSDI), 2010, pp. 1-14.

Brakmo, et al., "TCP Vegas: New Techniques for Congestion Detection and Avoidance", retrieved on Oct. 8, 2010 at <<http://www.cs.cornell.edu/courses/cs619/2004fa/documents/brakmo94tcp.pdf>>, ACM SIGCOM, Proceedings of Conference on Communications Architectures, Protocols and Applications, Aug. 1994, pp. 24-35.

Chen, et al., "Scheduling Deadline-Constrained Bulk Data Transfers to Minimize Network Congestion", IEEE Intl Symposium on Cluster Computing and the Grid (CCGRID), Rio De Janeiro, Brazil, May 2007, pp. 410-417.

Chen, et al., "Supporting Bulk Data Transfers of High-End Applications with Guaranteed Completion Time", IEEE Intl Conference on Communications (ICC), Glasgow, Scotland, Jun. 2007, pp. 575-580.

Chen, et al., "Understanding TCP Incast Throughput Collapse in Datacenter Networks", retrieved on Oct. 8, 2010 at <<http://conferences.sigcomm.org/sigcomm/2009/workshops/wren/papers/p73.pdf>>, ACM, Workshop on Research on Enterprise Networking (WREN), Barcelona, Spain, Aug. 2009, pp. 73-82.

Dean, et al., "MapReduce: Simplified Data Processing on Large Clusters", retrieved on Oct. 8, 2010 at <<http://www.stanford.edu/class/cs240/readings/dean.pdf>>, USENIX Association, Symposium on Operating Systems Design and Implementation (OSDI), 2004, pp. 137-149.

DeCandia, et al., "Dynamo: Amazon's Highly Available Key-value Store", retrieved on Oct. 8, 2010 at <<http://s3.amazonaws.com/AllThingsDistributed/sosp/amazon-dynamo-sosp2007.pdf>>, ACM, Proceedings of Symposium on Operating Systems Principles (SOSP), Stevenson, Washington, Oct. 2007, pp. 205-220.

Dukkipati, "Rate Control Protocol (RCP): Congestion Control to Make Flows Complete Quickly", retrieved on Oct. 8, 2010 at <<http://yuba.stanford.edu/~nanditad/thesis-NanditaD.pdf>>, Standford University, Doctoral Dissertation, Oct. 2007, pp. 1-168.

Ferrari, et al., "Network Support for Multimedia, A Discussion of the Tenet Approach", retrieved on Oct. 8, 2010 at <<http://citeseerx.ist.psu.edu/viewdoc/download?doi=10.1.1.43.8166&rep=rep1&type=pdf>>, University of California at Berkeley, Technical Report TR-92-072, Nov. 1992, pp. 1-15.

Greenberg, et al., "VL2: A Scalable and Flexible Data Center Network", retrieved on Oct. 8, 2011 at <<http://research.microsoft.com/en-us/um/people/srikanth/data/vl2_sigcomm09.pdf>>, ACM SIGCOMM, Barcelona, Spain, Aug. 2009, pp. 1-12.

Gu, et al., "Congestion Control for Small Buffer High Speed Networks", retrieved on Oct. 8, 2010 at <<http://www.cs.umass.edu/~yugu/papers/gu07infocom.pdf>>, IEEE Conference on Computer Communications (INFOCOM), May 2007, pp. 1037-1045.

Guo, et al., "DCell: A Scalable and Fault-Tolerant Network Structure for Data Centers", retrieved on Oct. 8, 2010 at <<http://research.microsoft.com/pubs/75988/dcell.pdf>>, ACM SIGCOMM, Seattle, Washington, Aug. 2008, pp. 1-12.

Hu, et al., "Design of Congestion Control Based on Instantaneous Queue Sizes in the Routers", retrieved on Oct. 8, 2010 at <<http://www3.ntu.edu.sg/home2007/huwu0001/Work%20@%20NTU/Congestion%20control_2009.pdf>>, Proceedings of IEEE Global Telecommunications Conference (GLOBECOM), Honolulu, Hawaii, 2009, pp. 1-6.

Isard, et al., "Dryad: Distributed Data-Parallel Programs from Sequential Building Blocks", retrieved on Oct. 8, 2010 at <<http://research.microsoft.com/pubs/63785/eurosys07.pdf>>, ACM, Proceedings of European Conference on Computer Systems (EuroSys), Lisbon, Portugal, Mar. 2007, pp. 1-14.

Katabi, et al., "Congestion Control for High Bandwidth-Delay Product Networks", retrieved on Oct. 8, 2010 at <<http://conferences.sigcomm.org/sigcomm/2002/papers/xcp.pdf>>, ACM SIGCOMM, Pittsburgh, Pennsylvania, Aug. 2002, pp. 1-14.

Kohavi, et al., "Controlled Experiments on the Web: Survey and Practical Guide", retrieved on Oct. 8, 2010 at <<http://exp-platform.com/Documents/hippo_long.pdf>>, Data Mining and Knowledge Discovery, vol. 19, No. 1, 2008, pp. 140-181.

"Latency Is Everywhere and It Costs You Sales—How to Crush It", retrieved on Oct. 8, 2010 at <<http://highscalability.com/blog/2009/7/25/latency-is-everywhere-and-it-costs-you-sales-how-to-crush-it.html>>, Possibility Outpost, High Scalability, Jul. 25, 2009, pp. 1-23.

Liu, et al., "Scheduling Algorithms for Multiprogramming in a Hard-Real-Time Environment", retrieved on Oct. 8, 2010 at <<http://www.google.co.uk/url?sa=t&source=web&cd=1&ved=0CBgQFjAA&url=http%3A%2F%2Fciteseerx.ist.psu.edu%2Fviewdoc%2Fdownload%3Fdoi%3D10.1.1.78.5086%26rep%3Drep1%26type%3Dpdf&ei=gYSuTOrMD5GK4Qb6zOmHBg&usg=AFQjCNHOrpR1hKd-tHz-h0tE64jdrXVxMg>>, Journal of the Association for Computing Machinery, vol. 20, No. I, Jan. 1973, pp. 46-61.

Mysore, et al., "PortLand: A Scalable Fault-Tolerant Layer 2 Data Center Network Fabric", retrieved on Oct. 8, 2010 at <<http://cseweb.ucsd.edu/~vahdat/papers/portland-sigcomm09.pdf>>, ACM SIGCOMM, Barcelona, Spain, Aug. 2009, pp. 1-12.

Qazi, et al., "On the Design of Load Factor based Congestion Control Protocols for Next-Generation Networks", retrieved on Oct. 8, 2010 at <<http://www.cs.pitt.edu/~ihsan/journal_mlcp.pdf>>, IEEE Conference on Computer Communications (INFOCOM), Phoenix, Arizona, Apr. 2008, pp. 96-100.

Saab, "Scaling Memcached at Facebook", retrieved on Oct. 8, 2010 at <<http://www.facebook.com/note.php?noteid=39391378919>>, Facebook, 2011, pp. 1.

Santana, et al., "Load Forecasting Applied to Soft Real-time Web Clusters", retrieved on Oct. 8, 2010 at <<http://www.tempo.uff.bilarquivos/sac2010.pdf>>, ACM, Symposium on Applied Computing (SAC), Sierre, Switzerland, Mar. 2010, pp. 346-350.

Schurman, et al., "The User and Business Impact of Server Delays, Additional Bytes, and HTTP Chunking in Web Search", retrieved on Oct. 8, 2010 at <<http://en.oreilly.com/velocity2009/public/schedule/detail/8523>>, O'Reilly Media, 2009, pp. 1-4.

Vasudevan, et al., "Safe and Effective Fine-grained TCP Retransmissions for Datacenter Communication", retrieved on Oct. 8, 2010 at <<http://www.cs.cmu.edu/~dga/papers/incast-sigcomm2009.pdf>>, ACM SIGCOMM, Barcelona, Spain, Aug. 2009, pp. 1-12.

Vogels, "Performance and Scalability", retrieved on Oct. 11, 2010 at <<http://www.allthingsdistributed.com/2006/04/performance_and_scalability.html>>, All Things Distributed weblog, Apr. 9, 2006, pp. 1-2.

Yan, et al., "Tesseract: A 4D Network Control Plane", retrieved on Oct. 8, 2010 at <<http://www.cs.northwestern.edu/~akuzma/classes/CS495-s07/doc/p4.pdf>>, USENIX Association, Symposium on Networked Systems Design and Implementation (NSDI), Cambridge, Massachusetts, Apr. 2007, pp. 1-14.

\* cited by examiner

DEADLINE-AWARE NETWORK PROTOCOL

BACKGROUND

As applications provided over communication networks have evolved, so to have the demands placed on these networks. For many years, packet-based communication networks have operated using the transport control protocol (TCP) to manage and regulate the reliable transmission of packets from a source to a destination. In scenario with multiple flows of data sharing network resources, TCP strives to share these network resources fairly between the flows.

Many web applications are of a "soft real-time" nature, meaning that users are to be served in a timely fashion, for example to meet a service level agreement (SLA). For example, data centers are used to provide many different types of online service or application, such as web search, social networking, retail, advertisements, and recommendation engines. SLAs for these applications often stipulate that requests are to be satisfied within a specified latency target, and when the time expires, responses, irrespective of their completeness, are shipped out from the data center. However, the completeness of the responses directly governs their quality.

Therefore, the soft real-time nature of these web applications (e.g. as provided by datacenters), leads to deadlines being associated with the application traffic. A network data flow is useful, and contributes to application throughput (and operator revenue) if, and only if, it completes within its deadline. Known transport protocols, given their Internet origins, are agnostic to such flow deadlines.

The embodiments described below are not limited to implementations which solve any or all of the disadvantages of known transport protocols.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A deadline-aware network protocol is described. In an example, data transfer at a transport layer entity of a packet-based communication network is controlled by receiving a request for network resources for a data flow from a network element and allocating network resources to the data flow. The data flow comprises a number of data packets associated with an application, and the request comprises a factor relating to a time deadline associated with the application. The network resources allocated depend on the factor relating to the time deadline. In examples, the network resource can be a bandwidth or data rate allocated to the data flow, and the factor can be a data rate sufficient to complete the data flow within the time deadline. In examples, the network resources are allocated greedily, such that requests are fully satisfied whenever possible, and the network resources are fully utilized.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a datacenter environment, the system described is provided as an example and not a limitation. As those skilled in the art will appreciate, the present examples are suitable for application in a variety of different types of data networking systems. In the description below, the term "data flow" is used to describe any transmission of data comprising a plurality of data packets.

Figure 1:
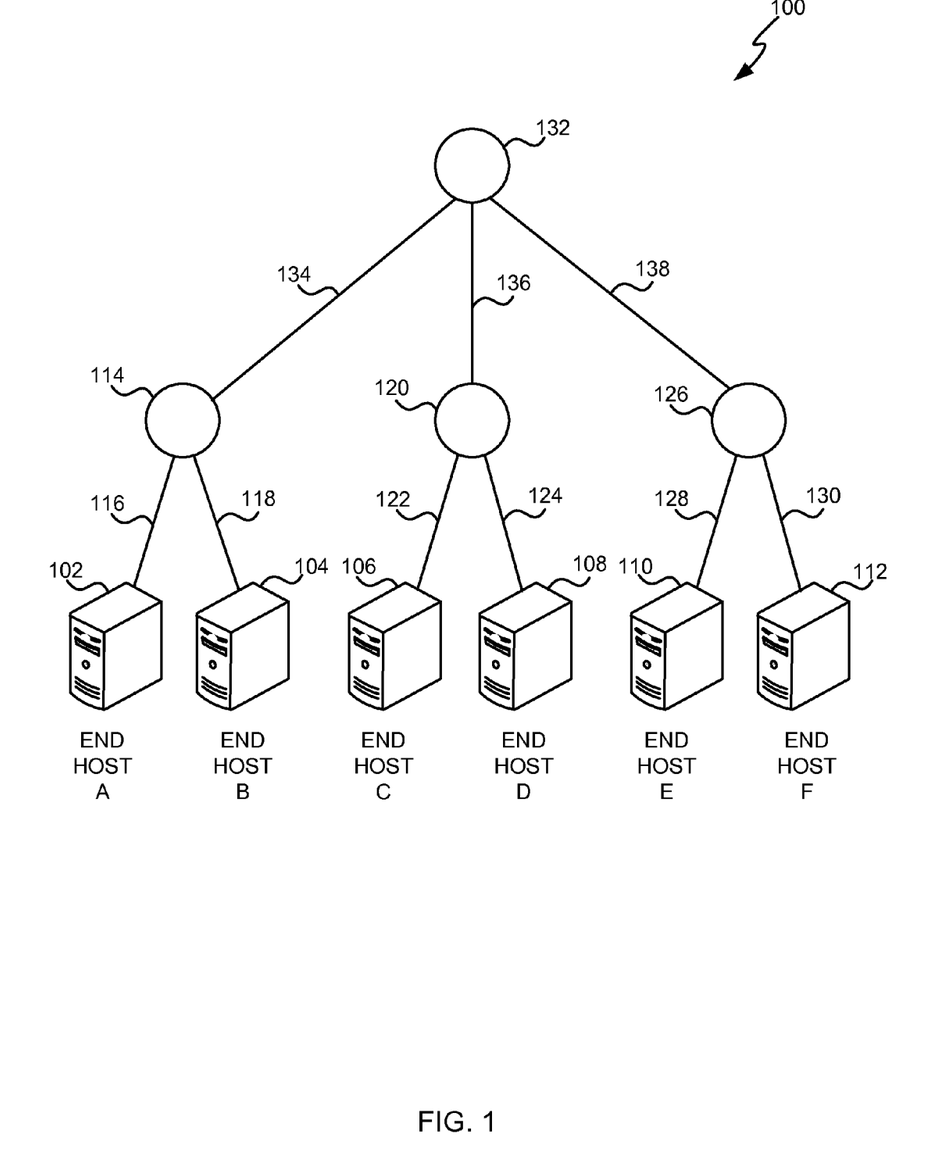
FIG. 1 illustrates an example communications network passing deadline-sensitive data.

Reference is first made to FIG. 1, which illustrates an example communication network 100 in which deadline-sensitive data may be passed. The network topology shown in FIG. 1 is illustrative of the type of topology seen in datacenters. However, this topology is used merely as an illustrative example, and any type of network structure can be used.

The communication network 100 of FIG. 1 comprises a plurality of end host devices. The end host devices can be any type of source or destination device, such as servers, data storage nodes, user terminals, processing elements, or any other network element that can request the use of network resources. FIG. 1 illustrates six end host devices: end host A 102; end host B 104; end host C 106; end host D 108; end host E 110; and end host F 112. In other examples, more or fewer end host devices can be present.

In the example of FIG. 1, each of the end host devices are connected to a router, switch, or other networking device arranged to control the flow of data packets. For example, end host A 102 is connected to router 114 via communication link 116, and end host B 104 is connected to router 114 via communication link 118. FIG. 1 also shows end host C 106 and D 108 connected to router 120 via communication link 122 and 124, respectively, and end host E 110 and F 112 connected to router 126 via communication link 128 and 130, respectively. The example network in FIG. 1 also shows router 114, 120 and 126 connected to a central router 132 via communication link 134, 136 and 138, respectively. Therefore, in this example, any end host device can communicate with any of the other end host devices by traversing two or more communication links joined by one or more routers. For example, end host A 102 can communicate with end host F 112 by sending data via router 114, 132 and 126, using communication links 116, 134, 138 and 130.

In the example of a data center environment, router 114, 120 and 126 may be a top-of-rack router, and router 132 may be a root switch. Such data centers are used for applications such as processing web search queries, recommendation engines, social networking services, serving advertisements, providing real-time media services, and in grid computing. Applications such as these (amongst others) often involve the transmission of data flows having associated deadlines. In alternative examples, different numbers of routers and communication links can be present, in any structure or orientation.

Figure 2:
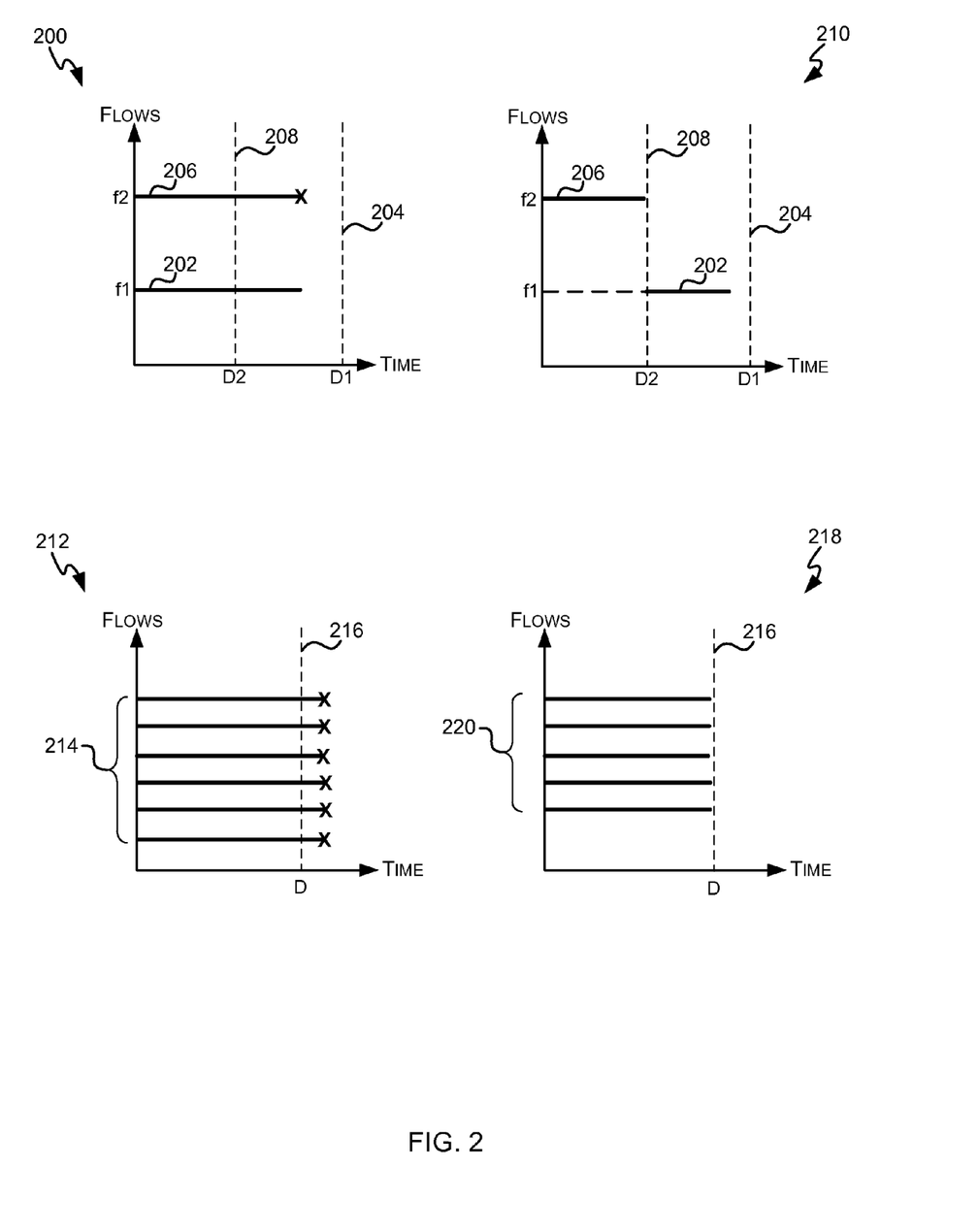
FIG. 2 illustrates examples of fair-sharing versus deadline-aware transmission of deadline-sensitive data.

Reference is now made to FIG. 2, which illustrate examples of how the control of network resources in a network such as that shown in FIG. 1 can affect deadline-sensitive data. Consider the case that end host A 102 is transmitting a data flow (denoted f1) to end host F 112, and end host B 104 is transmitting a data flow (denoted f2) to end host E 110. In this scenario, communication link 134 is being used by both data flows. If communication link 134 is acting as a bottleneck, then both data flows will contend for network resources on this link.

Firstly, graph 200 illustrates a scenario in which the two data flows are being transmitted over the bottleneck communication link 134 using a known transport layer protocol such as TCP. In this example, data flow f1 202 has a deadline D1 204 to complete transmission, and data flow f2 206 has a deadline of D2 208 to complete transmission. With TCP, the resources of the communication link 134 are shared fairly and equally between the two contending data flows. This means that the data flows f1 and 1'2 finish at similar times. Because the deadline D2 208 for flow f2 206 was earlier than the deadline D1 204 for flow f1 202, data flow f2 206 does not meet its deadline. This detriments application performance, and also wastes valuable network resources on a non-contributing data flow.

The scenario shown in graph 200 can occur with any type of transport layer or control protocol that aims for a fair share of network resources. Apart from TCP, this also applies to other protocols such as XCP and DCTCP.

Conversely, graph 210 shows the case where information on the deadlines that apply to the data flows is taken into account. In this case, it can be determined that data flow f2 206 has the earlier deadline and is served first, enabling the data flow to complete before deadline D2 208, and once this has completed data flow f1 202 is transmitted, and is able to complete before deadline D1 204. Therefore, by exposing information regarding the deadline of the data flows, the network can distribute network resources such that both deadlines can be met.

Graph 212 of FIG. 2 illustrates a further example in which six end hosts are attempting to concurrently transmit six data flows 214, all having the same deadline D 216. A fair-sharing transport protocol can result in all the data flows 214 completing at a similar time, and all of them missing the deadline. Graph 218 illustrates this scenario, except that the transport protocol is now deadline-aware, and has selected to quench one of the flows, such that now five data flows 220 are transmitted. The deadline-aware protocol has determined that by quenching one of the flows, the network congestion is reduced to the point where the remaining five data flows 220 are able to finish before deadline D 216.

The illustrative examples of FIG. 2 therefore show how a deadline-agnostic network, such as a TCP network, is not the optimum way to transfer such data. Described herein is a protocol that utilizes deadline information from the application in order to improve the allocation of network resources in such cases.

Figure 3:
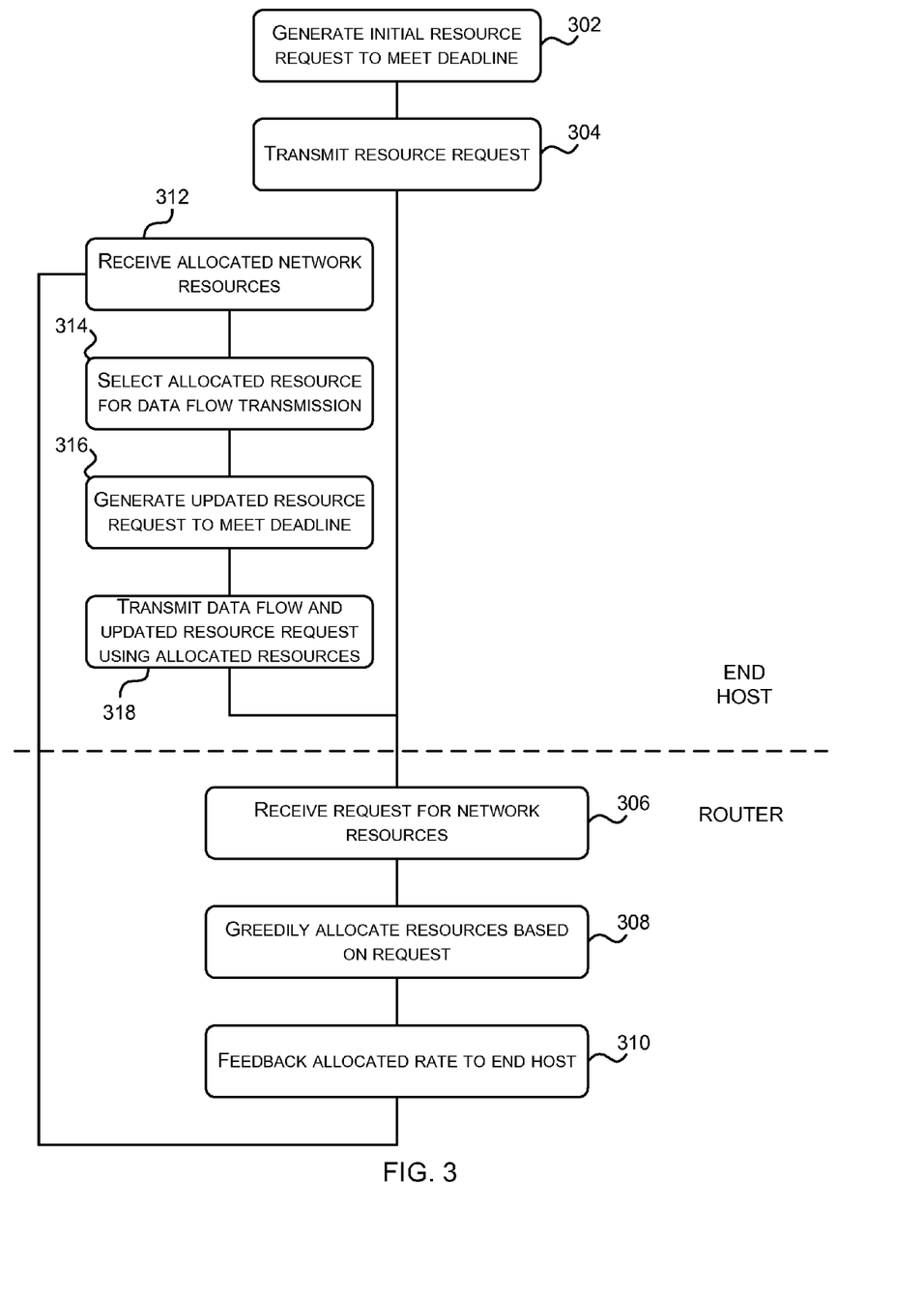
FIG. 3 illustrates a flowchart of a process for allocating network resources based on data flow deadlines.

Reference is now made to FIG. 3, which illustrates a high-level flowchart of a process for allocating network resources based on data flow deadlines. Firstly, the source end host sending the data flow generates 302 an initial request for network resources, taking into account the deadline for the data flow. The source end host determines the network resources that are needed in order for the data flow to be able to complete by the time the deadline expires. Note that the deadlines are associated with the data flows, not the individual packets within the data flows. Therefore, to meet the deadline, all the packets within the data flow have to arrive before the deadline expires.

For example, if the network resource in question is bandwidth or data rate over the communication links, then the source end host determines what instantaneous data rate would enable the packets of the data flow to be transferred before the deadline. This can be performed by calculating a data rate given by:

$$r = \frac{s}{d}$$

Where r is the requested data rate, s is the size of the data flow (e.g. in bits), and d is the time until expiry of the deadline. In alternative examples, a different factor relating to the deadline associated with the data flow can be calculated, depending on the network resource that is being requested.

Once the request for network resources to meet the deadline has been generated, the end host transmits 304 the initial resource request (optionally along with other data into the network). As described in more detail below, the resource request can be transmitted as part of the transport layer protocol packet header. Therefore, in this scenario, application layer information relating to the deadline associated with a data flow is being exposed to and used in the transport layer protocol.

The first router in the network along from the source end host receives 306 the resource request, and uses the resource request to greedily allocate 308 network resources associated with the router (e.g. bandwidth on the router's communication link) based on the request. The term "greedily" in this context means that the router is not aiming to share the resources fairly between competing data flows, but is instead allocating resources to those that data flows whose deadlines can be satisfied.

An example allocation technique is described below with reference to FIG. 4. The allocation of network resources described herein has several aims. Firstly, the allocation technique aims to maximize application throughput. Only flows that finish before their deadline contribute to application throughput, and hence, the protocol maximizes the number of flows that satisfy their deadlines. Secondly, the allocation technique aims to provide high network utilization. For example, for flows without deadlines, the protocol maximizes network throughput and achieves high utilization. Thirdly, the allocation technique aims to provide burst tolerance. Applications often generate flow bursts, and the network is able to accommodate these.

Once the network resources have been allocated to the data flow, the allocation is fed back 310 to the end host. The feedback of the allocation can be directly, for example via an acknowledgement packet. Alternatively, the feedback can comprise amending the packet header to include the allocation, and passing the packet header (with the associated data) onto the next downstream router in the network, such that the allocation is eventually fed back to the end host via the acknowledgement from the destination network element. This process is described in more detail with reference to FIGS. 5 and 6 below.

The end host receives 312 the allocated network resources fed back from the router. In some examples, where several routers are present in the path between the source end host and the destination, each router provides an allocation, resulting in the end host receiving a plurality of allocations. The end host selects 314 one of these resource allocations to be the one used to transmit the data flow. For example, the end host can select the minimum allocation from each of the routers, as this represents the bottleneck communication link, and hence it is inefficient to transmit using more resources than this bottleneck link can provide.

An updated resource request is then generated 316 which reflects any change in the network resources sufficient to meet the deadline. For example, if the end host was previously allocated fewer network resources than requested, then when a new request is generated this will be for more network resources. This is because time has elapsed during which an insufficient amount of the data flow was transmitted to meet the deadline (were the transmission to continue at this rate), and hence more resources are needed subsequently to catch-up and meet the deadline. Therefore, the updated resource request is based upon the remaining size of the data flow, i.e. how many bits/packets are currently un-transmitted and need to be sent before the deadline expires.

The end host then transmits 318 the data flow using the allocated resources, and also transmits the updated resource request, for example in a packet header associated with the data flow. In this way, the process of requesting and allocating network resources repeats, until either the data flow transmission is completed, or the end host chooses to cease transmission (e.g. if the data flow is unable to meet the deadline due to inadequate network resources being allocated). In one example, the end host updates and sends requests for network resources at every round trip time (RTT), i.e. upon receiving every acknowledgement packet from the destination.

Figure 4:
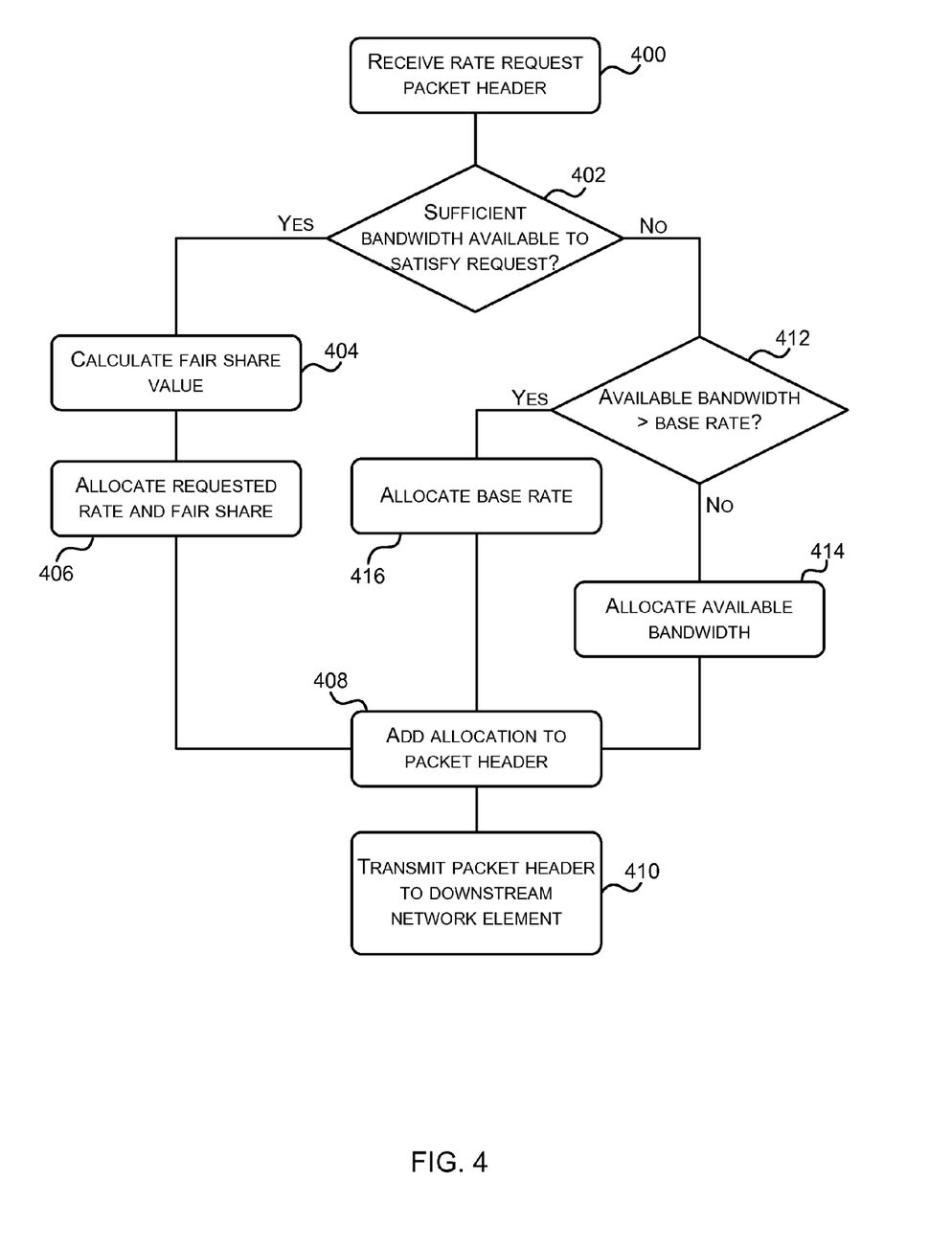
FIG. 4 illustrates a flowchart of a process for determining the network resources to allocate.

Reference is now made to FIG. 4, which illustrates a flow chart of a network resource allocation process that is performed by a transport-layer entity, such as one of the routers shown in FIG. 1. In the example of FIG. 4, the network resource to be allocated is bandwidth/data rate.

Firstly, the router receives 400 the packet header comprising the requested data rate from the source end host (i.e. the rate sufficient for the end host to complete the data flow within the deadline). Note that if a data flow does not have a deadline associated with it, then the requested rate is zero. It is then determined 402 by the router whether sufficient bandwidth is available on its associated communication link at the current time to satisfy the requested data rate. A technique for determining the communication link capacity is described in more detail below.

If it is determined 402 that there is sufficient bandwidth available to satisfy the requested data rate, then, because of the "greedy" approach to allocation, the allocation scheme attempts to allocate at least the requested rate. If the router has excess bandwidth after satisfying the rate requests, then this excess capacity is distributed equally amongst all flows on the communication link. To do this a "fair-share" value is calculated 404, where the fair-share is the portion of the spare communication link bandwidth given to each data flow on the link. The fair-share can be calculated from:

$$fs = \frac{C - D}{N}$$

Where fs is the fair share value, C is the communication link capacity, D is the current demand for bandwidth from all flows (i.e. the sum of the requested rates for all data flows), and N is the number of flows traversing the communication link. The router then allocates 406 the end host the requested rate plus the fair-share value. In other words, in the case of the router having spare capacity on its communication link, for a requested rate r, the allocation a=r+fs. In the case of a data flow without a deadline, the requested rate r=0, and hence the allocation a=fs. Assigning deadline flows with a rate greater than their requested rate ensures that their subsequent rate requests will be lower and the network is able to satisfy future deadline flows. At the same time, assigning non-deadline flows with a share of the spare capacity ensures that they make progress and network utilization remains high.

The rate allocation is then added 408 to the packet header. By inserting the allocation into the packet header, then a list or vector is generated comprising the allocations made by each router as the packet header passes through the network. This can then be ultimately fed back to the source end host, who can select the rate to use from this vector (e.g. the minimum as described above). The router transmits 410 (i.e. forwards) the amended packet header to the next downstream network element (be it a further router that adds an additional allocation to the packet header, or the destination network element).

Returning again to the determination of whether sufficient bandwidth is available on the communication link, if it was determined 402 that sufficient bandwidth is not available to satisfy the rate request, then it is determined 412 whether the bandwidth available is greater than a predefined base rate value. The base rate value is a low data rate that is sufficient for the end host to transmit a header-only packet, and therefore use this to request rates in the future, but is not sufficient to transmit the data flow as well.

If it is determined that the available bandwidth is greater than the base rate value (but less than the requested rate), then the available bandwidth is allocated to the data flow. In other words, the data flow is allocated as much bandwidth as possible, even though it is less than that requested. Conversely, if the available bandwidth is less than or equal to the base rate value, then the base rate is allocated to the data flow. This allows the data flow to send future rate requests, and hence does not prevent the data flow from continuing again at some future point (e.g. once congestion has eased). For data flows with a deadline, such low rate allocations cause the desired rate to increase. The end hosts can thus decide whether to give up on flows based on an ever increasing desired rate.

The allocated rates are then added 408 to the packet header and the router transmits 410 the amended packet header to the next downstream network element as described above.

In one example, the rate allocation technique described above can be performed such that the router receives the rate requests for all flows at the same point in time, i.e. in synchronized manner. In an alternative example, the router can make allocation determinations in an online, dynamic setting in which rate requests are spread over time. To achieve this, the rate allocation scheme operates in a slotted fashion (from the perspective of the end hosts). The rate allocated to a flow is valid for the next RTT, after which the flow requests a rate again.

In one example, in order to implement the allocation scheme above in an efficient manner, the routers maintain three aggregate counters for each communication link:

The number of flows traversing the communication link (denoted N). Routers use flow initiation and termination packets (such as TCP SYN/FIN packets) to increment and decrement N respectively.

A demand counter (denoted D). This is the sum of the requested rates for all deadline flows on the communication link. This represents the total demand imposed by all data flows with deadlines.

An allocation counter (denoted A). This is the sum of the allocated rates, i.e. the current total allocation.

The router also determines the current rate allocated to a data flow requesting a rate. In one example, a router can maintain rate allocations for each active data flow through it. Alternatively, to avoid storing per-flow state on the routers, the end hosts can be arranged to convey rate allocations for each flow. For example, each rate request packet header, apart from the including the requested rate $r_{t+1}$, can comprise the rate requested in the previous interval ($r_t$) and a vector of the rates allocated in the previous interval (denoted $[a_t]$). Each element in the vector corresponds to the rate allocated by a router along the path in the previous interval. The encoding of this in the rate request packet header is described in more detail with reference to FIG. 5, below.

Given these data items, the routers can readily implement the allocation scheme described with reference to FIG. 4. For example, the pseudo-code given below provides an illustration of how a router can process a rate request packet using the above data items to efficiently implement the allocation scheme. This applies to both deadline and non-deadline flows (for the latter, the requested rate $r_{t+1}$ is zero). In this example, the router has received a rate request packet header comprising the requested rate for the next interval $r_{t+1}$, and information on the current interval requested rate $r_t$ and allocated rate $a_t$. The communication link capacity is C. The router is aiming to calculate the allocated rate for the next interval $a_{t+1}$.

```
1:  if (new_flow_flag_set) N = N + 1
2:  A = A - a_t
3:  D = D - r_t + r_{t+1}
4:  left capacity = C - A
5:  fs = (C - D)/N
6:  if left capacity > r_{t+1} then
7:      a_{t+1} = r_{t+1} + fs
8:  else
9:      a_{t+1} = left capacity
10: end if
11: a_{t+1} = max(a_{t+1}, base rate)
12: A = A + a_{t+1}
```

At line 1, the router determines whether this is a new data flow, and if so increments the flow counter N. At line 2, the router returns the current allocation given to the data flow $a_t$ (provided in the vector $[a_t]$ in the packet header) to the total allocation counter A. At line 3, the demand counter D is updated to return the current rate request $r_t$ and add the new rate request $r_{t+1}$. The available current capacity left on the communication link is calculated at line 4 from the difference of the capacity C and the total allocation A. The fair share fs is calculated at line 5.

At line 6, if there is enough spare capacity to satisfy the request, then the allocated rate for the next interval $a_{t+1}$ is found from the sum of the request for the next interval $r_{t+1}$ and the fair share fs, at line 7. Otherwise, at line 8 and 9, if there is not enough spare capacity, the allocated rate for the next interval $a_{t+1}$ is set to the left capacity. The allocated rate for the next interval $a_{t+1}$ is set to at least the base rate at line 11. Finally, at line 12, the total allocation counter A is updated in view of the new allocation $a_{t+1}$.

Of note is the scenario where the router does not have enough capacity to satisfy a rate request (line 9). This can occur in a couple of scenarios. First, the cumulative rate requested by existing deadline flows, represented by the demand counter D, may exceed the router capacity. In this case, the router satisfies as many requests as possible in the order of their arrival. In the second scenario, the demand does not exceed the capacity but fair share (fs) allocations to existing flows imply that when the rate request arrives, there is not enough spare capacity. However, the increased demand causes the fair share assigned to the subsequent rate requests to be reduced (line 5). Consequently, when the deadline flow in question requests for a rate in the next interval, the router may be able to satisfy the request.

Note that the allocation scheme can be implemented in any suitable manner, which can be different to that illustrated in the pseudo-code above.

The allocated rate given by a router to a data flow is based on the assumption that the flow is bottlenecked at that router. In a multi-hop network involving several routers, this may not be true in all cases. In some examples, to account for bottlenecks that occur earlier along the path, a router can ensure that its allocation is not more than that of the previous router. This information is available in the rate allocation vector being carried in the packet header, as described below. However, the data flow may still be bottlenecked downstream from the router (which the router is unaware of) and hence the data flow may not be able to utilize its allocation from that router. In addition, the veracity of the allocation counter A maintained by a router depends on end hosts returning their allocations. When a flow ends, the final rate request packet (e.g. carrying the TCP FIN flag) returns the flow's allocated rate. Failures at the end hosts can cause this not too occur. This can cause the router to over-estimate the allocated rate, and, as a result, penalize the performance of active flows. Furthermore, a burst of new flows can cause the router to temporarily allocate more band-width than its capacity, which results in queuing.

To account for these issues, the value for the router's communication link capacity C (i.e. total available bandwidth) can be periodically adjusted based on observed utilization and queuing as follows:

$$C(t+1) = C(t) + \alpha\left(C(t) - \frac{u(t)}{T}\right) - \beta\left(\frac{q}{T}\right)$$

Where C(t) is the link/router capacity for time interval t, T is the update interval, u(t) is the number of bytes sent during time interval t, q is the instantaneous queue size, and $\alpha$ a and $\beta$ are values chosen for stability and performance. In one example, $\alpha$ and $\beta$ can set to 0.1 and 1, respectively.

As a result of this determination of the capacity, when there is under-utilization (i.e. u (t)/T>c(t)), the router compensates by allocating more total capacity in the next interval, while when there is queuing (q(t)>0), the allocation of capacity reduces. Apart from addressing the downstream bottleneck issue mentioned above, this ensures that the counters maintained by routers are "soft state", and divergence from reality does not substantially impact correctness. The failure of end hosts and routers may cause flows to not return their allocation, but the resulting drop in utilization drives up the capacity, and hence the allocation counters do not have to be consistent with reality. The router, during periods of low load, resets its counters to return to a consistent state.

Figure 5:
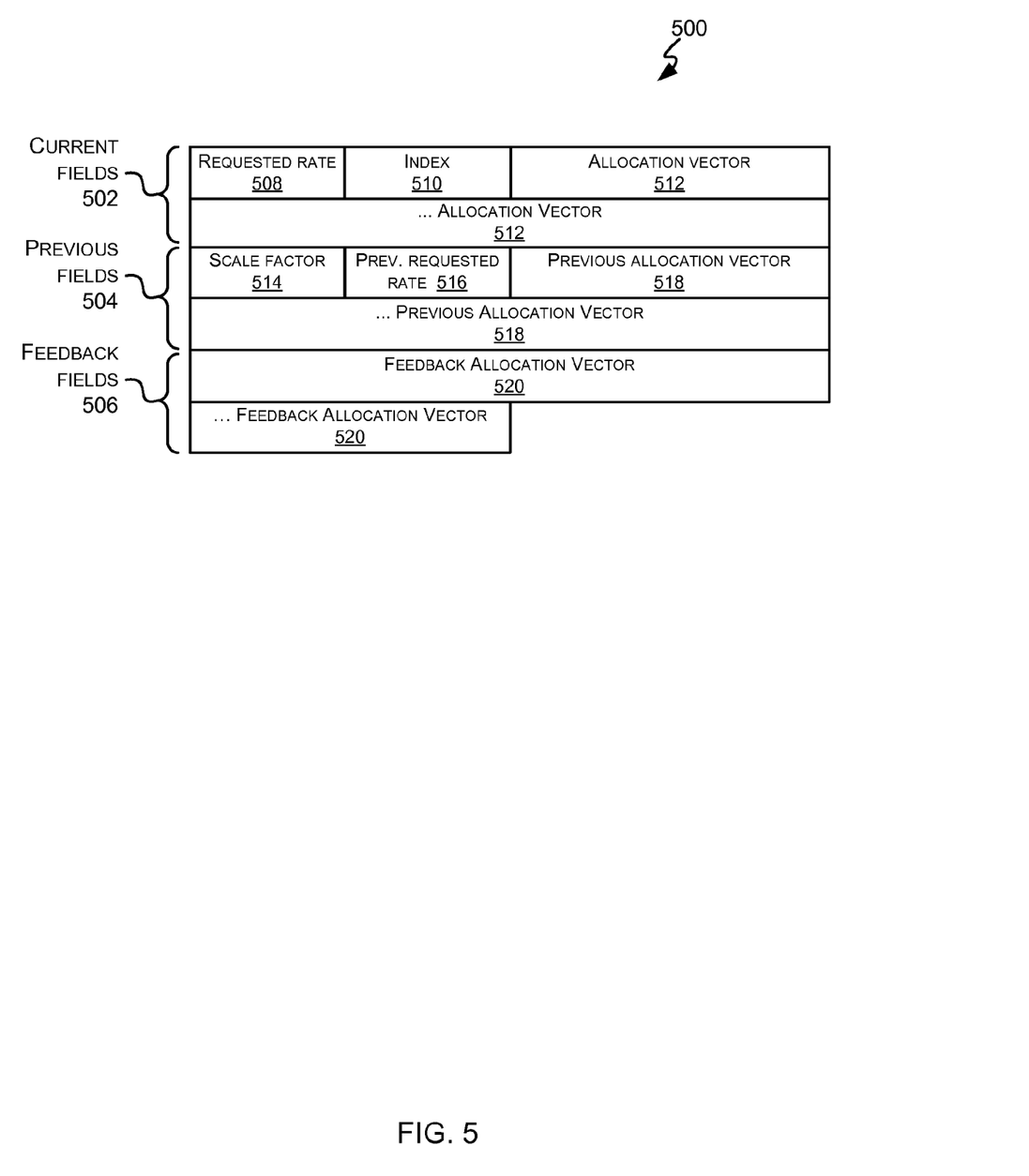
FIG. 5 illustrates an example packet header for a deadline-aware protocol.

Reference is now made to FIG. 5, which illustrates the structure of an example packet header 500 that can be used to implement the deadline-aware network protocol described above. The packet header 500 comprises three groups of fields. A group of current fields 502 comprises data relating to current requested resources and allocations, a group of previous fields 504 comprises data relating to previous requests and allocations, and a group of feedback fields 506 comprises data relating to allocations for reverse traffic from the destination to the source.

The current fields 502 comprise the rate request 508, which is the rate requested for the forthcoming time interval, i.e. $r_{t+1}$, which can be calculated as described above with reference to FIG. 3. An index 510 field acts as an index into the allocation vector 512. The index 510 is incremented in the packet header at each router, so that the router knows where in the allocation vector 512 to write information. The allocation vector 512, $[a_{t+1}]$, comprises a list of values, each value calculated by a router and inserted in the appropriate position in the vector as the packet header traverses the path between source and destination. The allocation vector 512 in the current fields 502 are the allocations for the forthcoming time interval, which are ultimately fed back to the source end host after the destination is reached.

The previous fields 504 comprise an optional scale factor 514, which can be used to scale values in the packet header, for example if higher rate values are used. The previous fields 504 also comprise the previous requested rate, i.e. $r_t$, and the previous allocation vector 518, i.e. $[a_t]$. This enables the router to maintain their counters, as described above. The feedback fields 506 comprise a feedback allocation vector 520, which the packet header uses to carry rate feedback to the destination network element. This is therefore a vector of rates allocated by the routers for reverse traffic from the destination to the source end host.

Note that, in other examples, the fields of the packet header can be in different sequences, or of different sizes to that shown in FIG. 5.

Figure 6:
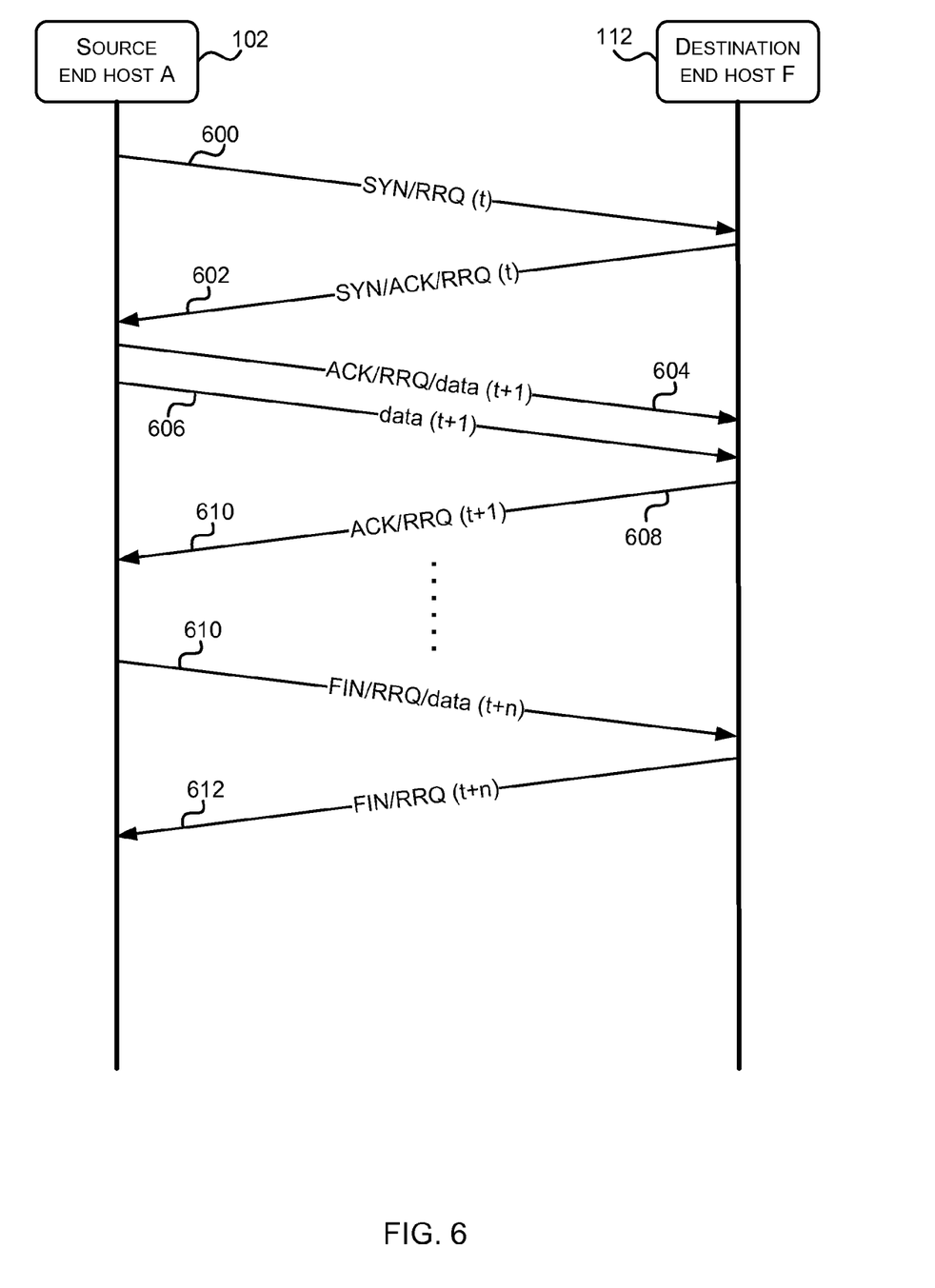
FIG. 6 illustrates a signaling chart for an example deadline-aware data flow.

Reference is now made to FIG. 6, which illustrates the overall operation of the deadline-aware protocol, in the example of a transfer of a data flow with a deadline from source end host A 102 to destination end host F 112 as shown in FIG. 1. Firstly, the source end host A 102 initiates the flow by sending a SYN packet 600 with a rate request 508 (denoted RRQ in FIG. 6) in the packet header 500, calculated as described above. This starts the first RTT interval t. The routers along the path between source end host A 102 and destination end host F 112 each allocate rates as described with reference to FIG. 4, and add these to the current allocation vector 512 in the packet header 500.

When the SYN packet 600 reaches the destination end host F 112, it responds with a SYN/ACK packet 602, which has a packet header comprising a rate request for the destination end host F 112 and a feedback allocation vector 520 having the current allocation vector from the SYN packet 600 as completed by each of the routers. When the source end host A 102 receives the SYN/ACK packet 602, it reads the feedback allocation vector 520 and determines its sending rate (e.g. from the minimum of the values in the feedback allocation vector 520).

The source end host A 102 then starts transmitting the data flow at this sending rate with data packet 604. Transmission of data packet 604 starts RTT interval t+1. Data packet 604 comprises a packet header with a rate request for the forthcoming time interval, which is updated based on the current allocated rate, as outlined above. During RTT interval t+1, further data packets (such as data packet 606) are sent. These do not comprise further rate requests, as they are still within this RTT interval until an ACK packet 608 is received from the destination end host F 112. The ACK packet 608 comprises a further rate request for destination end host F 112 and a feedback vector comprising the allocations for interval t+2.

This is repeated until the data flow transmission is completed at RTT interval t+n, at which point the source end host A 102 transmits a FIN packet 610, which the routers use to trigger the return of the current allocation for the data flow in their counters. A FIN packet 612 from the destination to the source returns the allocations for the reverse direction.

The above-described deadline-aware protocol therefore enables improved application throughput by exposing the deadlines associated with data flows to the transport-layer protocol. This allows the allocation scheme to take the deadlines into account when allocating network resources to data flows, such that data flows are provided with sufficient resources to enable them to complete in advance of the deadline, rather than just sharing the resources equally between all data flows.

Figure 7:
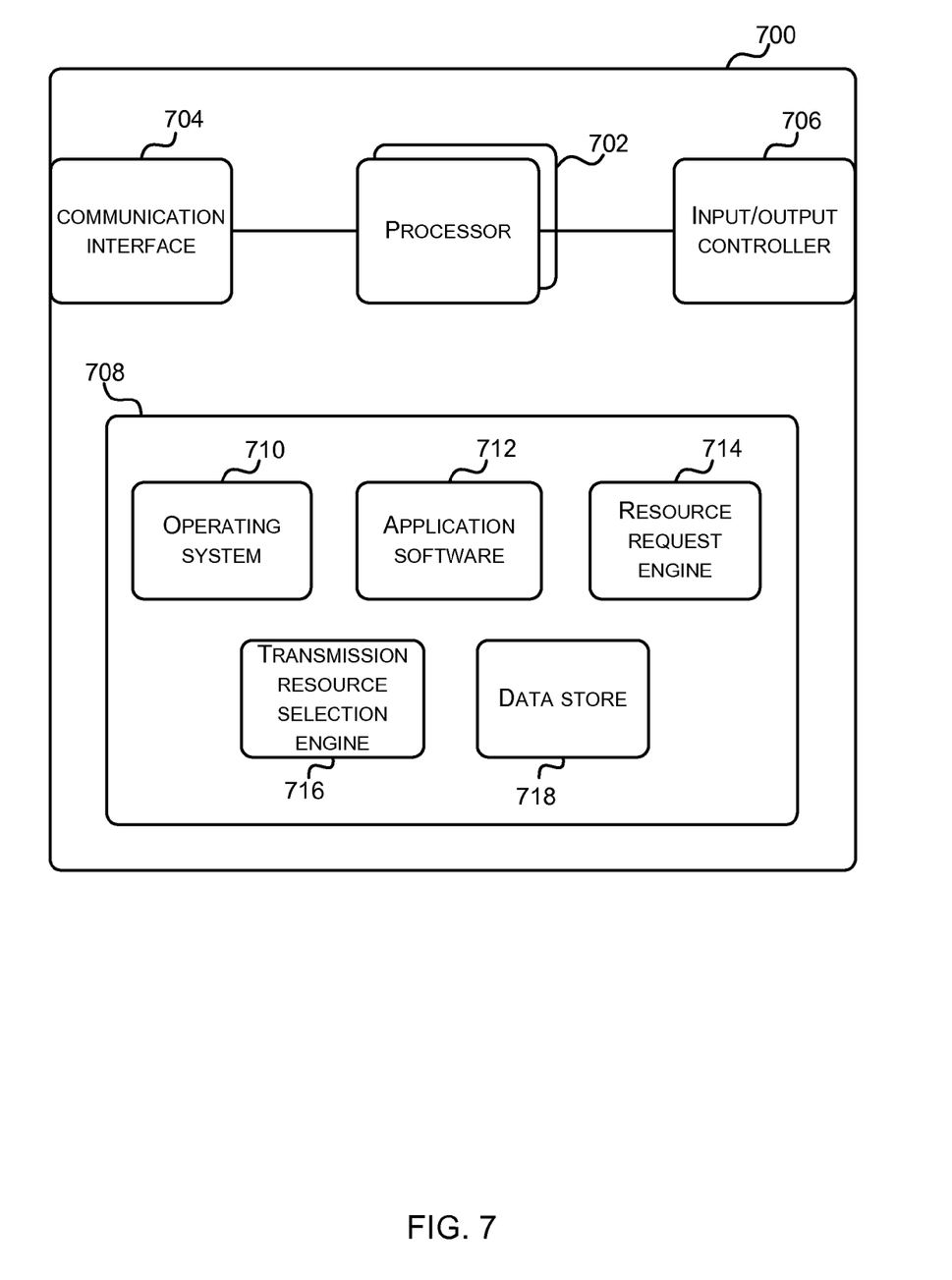
FIG. 7 illustrates an exemplary network element in which embodiments of the deadline-aware protocol may be implemented.

FIG. 7 illustrates various components of an exemplary network element 700 which may be implemented as any form of a computing and/or electronic device, and in which embodiments of the deadline-aware control protocol may be implemented. In the example of FIG. 7, the network element 700 is the end host utilizing the deadline-aware control protocol described above.

Network element 700 comprises one or more processors 702 which may be microprocessors, controllers or any other suitable type of processors for processing computing executable instructions to control the operation of the device in order to implement the deadline-aware control protocol. In some examples, for example where a system on a chip architecture is used, the processors 702 may include one or more fixed function blocks (also referred to as accelerators) which implement a part of the deadline-aware control protocol in hardware (rather than software or firmware).

The network element 700 also comprises a communication interface 704 arranged to send and receive data over the communication network 100, for example sending/receiving data from the routers over the communication links. Optionally, the network element 700 may also comprise an input/output interface 706, which can be arranged to output display information to a display device (which may be separate from or integral to the network element 700). The input/output interface 706 may also be arranged to receive and process input from one or more devices, such as a user input device.

Platform software comprising an operating system 710 or any other suitable platform software may be provided at a memory 708 of the network element 700 to enable application software 712 to be executed on the network element. The memory 708 can store executable instructions to implement the functionality of a deadline-aware network resource request engine 714 arranged to determine network resources sufficient to enable completion of a data flow transfer before expiry of a deadline, and a transmission resource selection engine 716 arranged to select a transmission resource (such as a rate) from the feedback provided by the routers. The memory 708 can also provide a data store 718, which can be used to provide storage for data used by the processors 702 when operating the deadline-aware control protocol, for example to store the previous allocations as described above.

Figure 8:
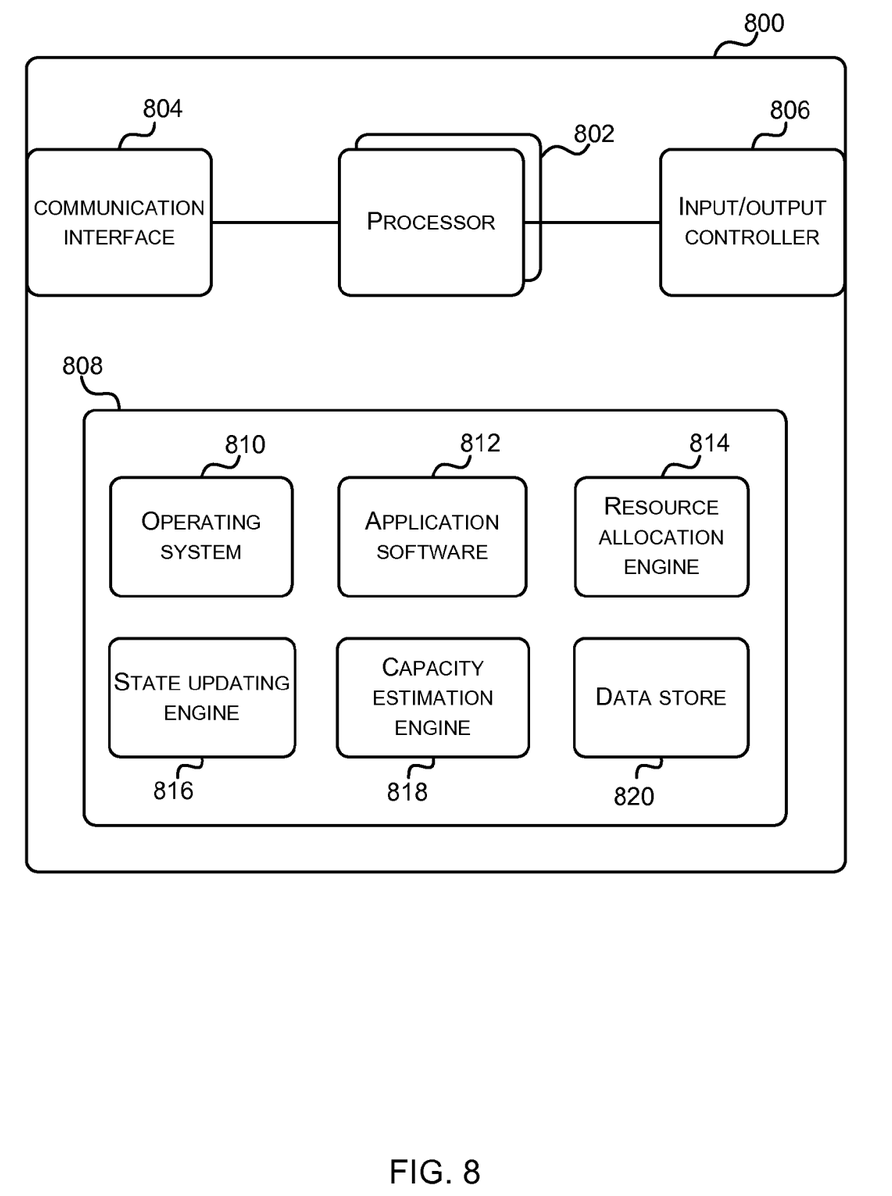
FIG. 8 illustrates an exemplary transport-layer entity in which embodiments of the deadline-aware protocol may be implemented Like reference numerals are used to designate like parts in the accompanying drawings.

FIG. 8 illustrates various components of an exemplary transport-layer entity 800 which may be implemented as any form of a computing and/or electronic device, and in which embodiments of the deadline-aware control protocol may be implemented. In the example of FIG. 8, the transport-layer entity 800 is the router implementing the allocation scheme described above.

Transport-layer entity 800 comprises one or more processors 802 which may be microprocessors, controllers or any other suitable type of processors for processing computing executable instructions to control the operation of the device in order to implement the deadline-aware control protocol. In some examples, for example where a system on a chip architecture is used, the processors 802 may include one or more fixed function blocks (also referred to as accelerators) which implement a part of the deadline-aware control protocol in hardware (rather than software or firmware).

The transport-layer entity 800 also comprises a communication interface 804 arranged to send and receive data over the communication network 100, for example sending/receiving data from end hosts or other routers. Optionally, the transport-layer entity 800 may also comprise an input/output interface 806, which can be arranged to output display information to a display device (which may be separate from or integral to the transport-layer entity 800). The input/output interface 806 may also be arranged to receive and process input from one or more devices, such as a user input device.

Platform software comprising an operating system 810 or any other suitable platform software may be provided at a memory 808 of the transport-layer entity 800 to enable application software 812 to be executed on the device. The memory 808 can store executable instructions to implement the functionality of a deadline-aware network resource allocation engine 814, a state updating engine 816 arranged to maintain the router counters, and a capacity estimation engine 818 arranged to determine the router capacity from the utilization and queuing as described above. The memory 808 can also provide a data store 820, which can be used to provide storage for data used by the processors 802 when operating the deadline-aware control protocol, for example to store the router counters described above.

Computer-executable instructions and data storage can be provided using any computer-readable media that is accessible by network element 700 in FIG. 7 or transport-layer entity 800 in FIG. 8. Computer-readable media may include, for example, computer storage media such as memory 708 or 808 and communications media. Computer storage media, such as memory 708 or 808, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (such as memory 708 or 808) is shown within the network element 700 and transport-layer entity 800 it will be appreciated that the storage may be distributed or located remotely and accessed via a network or other communication link (e.g. using communication interface 704 or 804).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of controlling data transfer at a transport-layer entity of a packet-based communication network, the method comprising:
  receiving a request for network resources for a data flow from a network element, the data flow comprising a plurality of data packets associated with an application, and the request comprising a factor relating to a time deadline associated with the application, the request further comprising an allocated rate data structure, the allocated rate data structure including one or more data rate allocations associated with one or more of a plurality of network elements associated with the dataflow; and
  dynamically allocating network resources to the data flow based on the factor responsive to receiving the request by removing network resources from at least one other data flow such that every data flow is allocated at least a base data rate.

2. A method according to claim 1, wherein the network resources comprise a data rate for transmission of the data flow over the communication network.

3. A method according to claim 2, wherein the factor comprises a requested instantaneous data rate for transmission of the data flow over the communication network.

4. A method according to claim 3, wherein the requested instantaneous data rate is determined from the time deadline and a value for the remaining un-transmitted size of the data flow, such that the requested instantaneous data rate enables all the packets of the data flow to be transmitted within the time deadline.

5. A method according to claim 3, wherein the step of allocating network resources comprises determining whether sufficient network bandwidth is currently available to satisfy the requested instantaneous data rate.

6. A method according to claim 5, wherein, if sufficient network bandwidth is available, the step of allocating comprises:
  allocating the requested instantaneous data rate to the data flow;
  determining a value for excess network bandwidth available after allocating the requested instantaneous data rate to the data flow; and
  distributing the excess network bandwidth between all data flows at the transport-layer entity.

7. A method according to claim 5, wherein, if sufficient network bandwidth is not available, the step of allocating comprises allocating a data rate corresponding to the network bandwidth currently available to the data flow.

8. A method according to claim 7, wherein if the network bandwidth currently available is less than a predefined base rate, allocating a data rate corresponding to the base rate to the data flow.

9. A method according to claim 5, further comprising the step of periodically updating a value for the network bandwidth available based on queue sizes at the transport-layer entity.

10. A method according to claim 9, further comprising the step of inserting the data rate allocated into the allocated rate data structure and forwarding the packet header to a further network element over the communication network.

11. A method according to claim 3, wherein the request for network resources is received in a packet header comprising the requested instantaneous data rate and the allocated rate data structure.

12. A method according to claim 11, further comprising the steps of:
  storing, at a data store, a counter of the number of data flows at the transport-layer entity, a sum of the total data rates requested by all data flows at the transport-layer entity, and a sum of the total data rates allocated to all data flows at the transport-layer entity; and
  updating the counter, the sum of the total data rates requested, and the sum of the total data rates allocated responsive to receiving the request.

13. A method according to claim 12, wherein the packet header further comprises a value for the data rate previously requested for the data flow, and a value for the data rate previously allocated to the data flow, and the step of updating comprises:
  subtracting the value for the data rate previously allocated from the sum of the total data rates allocated; and
  subtracting the value for the data rate previously requested from the sum of the total data rates requested; and
  adding the requested data rate to the sum of the total data rates requested.

14. A method according to claim 1, further comprising the step of sending an acknowledgement packet comprising the network resources allocated to the data flow to the network element.

15. A method according to claim 14, further comprising the step of receiving a further request for network resources for the data flow from the network element during transmission of the data packets and sent responsive to receipt of the acknowledgement packet at the network element, the further request comprising an updated factor relating to the time deadline associated with the application.

16. A method according to claim 1, wherein an end host selects a data rate allocation from the allocated rate data structure.

17. A network element, comprising:
  a communication interface arranged to send and receive data over a packet-based communication network;
  a processor arranged to: generate a request for network resources for transmission of a data flow, wherein the data flow comprises a plurality of data packets associated with an application, and wherein the request comprises a factor relating to a time deadline associated with the application, the request further comprising an allocated rate data structure; transmit the request via the communication interface; receive a response to the request via the communication interface comprising a plurality of network resource allocations; and subsequently transmit the data flow using a selected one of the network resource allocations; and
  the network element being a user terminal.

18. A network element according to claim 17, wherein the processor is arranged to select the minimum of the network resource allocations as the selected one of the network resource allocations.

19. A network element according to claim 17, wherein the network resources comprise a data rate for transmission of the data flow over the communication network, the factor comprises a requested instantaneous data rate for transmission of the data flow over the communication network, and the processor is arranged to determine the requested instantaneous data rate from the time deadline and a value for the remaining un-transmitted size of the data flow, such that the requested data rate enables all the packets of the data flow to be transmitted within the time deadline.

20. A method of controlling data transfer between an end host and a router connected by a packet-based communication link in a data center processing web-search queries, the method comprising:

transmitting, from the end host via the communication link, a request for instantaneous communication link bandwidth for a data flow, wherein the data flow comprises a plurality of data packets associated with a web-search query and is associated with a time deadline for completing transmission of the data packets, and the bandwidth requested is determined from the time deadline and a value for the remaining data flow size, such that the bandwidth requested enables all the packets of the data flow to be transmitted within the time deadline, the request including an allocated rate data structure, the allocated rate data structure being able to store a set of data rate allocations associated with one or more of a plurality of network elements associated with the data-flow, a value for the data rate previously requested for the data flow, and a value for the data rate previously allocated to the data flow;

receiving an acknowledgement packet comprising a data rate allocated to the end host over the communication link;

storing, at a data store, a counter of the number of data flows at the communication link, a sum of the total data rates requested by all data flows at the communication link, and a sum of the total data rates allocated to all data flows at the communication link;

updating the counter, the sum of the total data rates requested, and the sum of the total data rates allocated responsive to receiving the request, the step of updating comprising:

subtracting the value for the data rate previously allocated from the sum of the total data rates allocated;

subtracting the value for the data rate previously requested from the sum of the total data rates requested; and     adding the requested data rate to the sum of the total data rates requested.

\* \* \* \* \*